United States Patent
Webb

(10) Patent No.: US 6,384,334 B1
(45) Date of Patent: May 7, 2002

(54) ELECTRICAL JUNCTION BOX AND SUPPORT BRACKET HAVING SLIDING ATTACHMENT

(76) Inventor: Ronald D. Webb, 140 E. Santa Clara St. #14, Arcadia, CA (US) 91006

( * ) Notice: Subject to any disclaimer, the term of this patent is extended or adjusted under 35 U.S.C. 154(b) by 0 days.

(21) Appl. No.: 09/658,906

(22) Filed: Sep. 11, 2000

(51) Int. Cl.[7] ................................................ H01H 9/02
(52) U.S. Cl. ........................... 174/58; 174/50; 220/3.9; 248/311.2
(58) Field of Search .............................. 174/48, 50, 58, 174/63; 248/300, 27.1, 906, 311.2, 205.1, 544, 225.21, 224.8; 220/3.9, 3.92, 3.6, 3.8, 3.3, 3.7

(56) References Cited

U.S. PATENT DOCUMENTS

| | | | |
|---|---|---|---|
| 1,835,633 A | * 12/1931 | Calderwood | 174/63 |
| 4,135,337 A | * 1/1979 | Medlin | 52/221 |
| 4,237,666 A | * 12/1980 | Kohaut | 52/221 |
| 4,660,793 A | * 4/1987 | Mark | 228/224.8 |
| 4,716,496 A | * 12/1987 | Fritsch | 174/48 |
| 5,098,046 A | 3/1992 | Webb | 248/27.1 |
| 5,224,673 A | 7/1993 | Webb | 248/27.1 |
| 5,288,041 A | 2/1994 | Webb | 248/27.1 |
| 5,349,134 A | * 9/1994 | Russell | 174/48 |
| 5,456,373 A | * 10/1995 | Ford | 220/242 |
| 5,906,346 A | * 5/1999 | Lin et al. | 248/224.8 |

* cited by examiner

Primary Examiner—Anthony Dinkins
Assistant Examiner—Angel R. Estrada
(74) Attorney, Agent, or Firm—Roy A. Ekstrand

(57) ABSTRACT

An electrical junction box includes a box enclosure having an open face supporting a pair of downwardly extending shorter length tabs on its upper edge and a pair of upwardly extending longer tabs on its lower edge. A riser having a base for attachment to a floor track within a wall or partition includes an opening formed therein to define a box mounting portion of the riser. The box mounting portion of the riser further includes a pair of upper slots having a spacing therebetween corresponding to the spacing between the upper tabs of the junction box. The box mounting portion of the riser further includes a pair of lower slots having a spacing therebetween corresponding to the upwardly extending lower tabs of the junction box. The slots are formed as generally rectangular punched U-shaped members having rear surfaces which define respective apertures therein. The upper tabs and lower tabs of the junction box define corresponding apertures. The junction box is assembled to the rear surface of the riser in a sliding attachment and secured following sliding attachment assembly by one or more conventional fasteners.

7 Claims, 3 Drawing Sheets

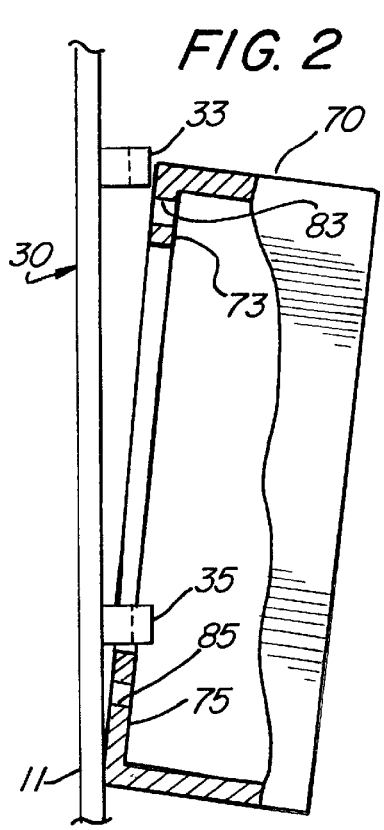
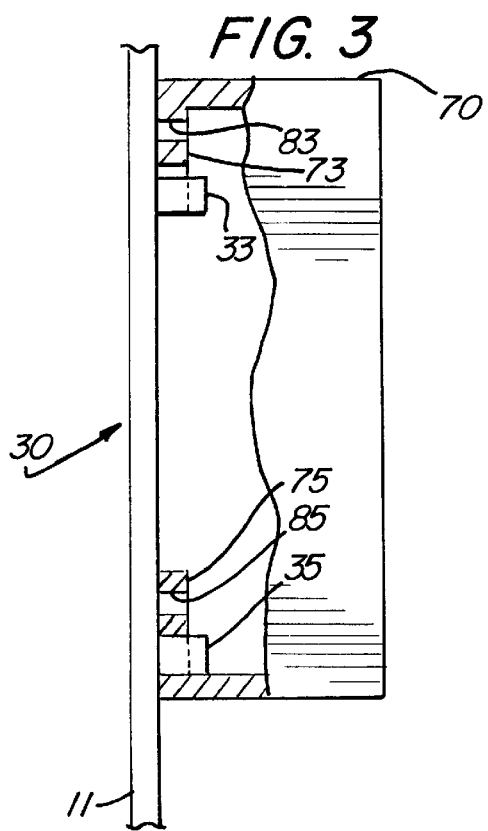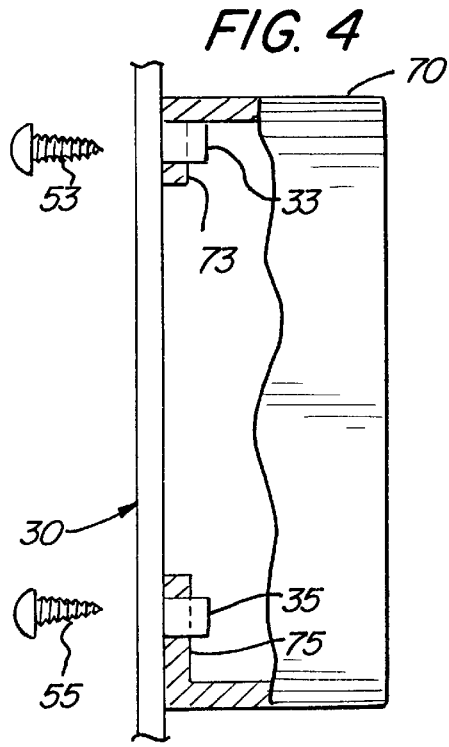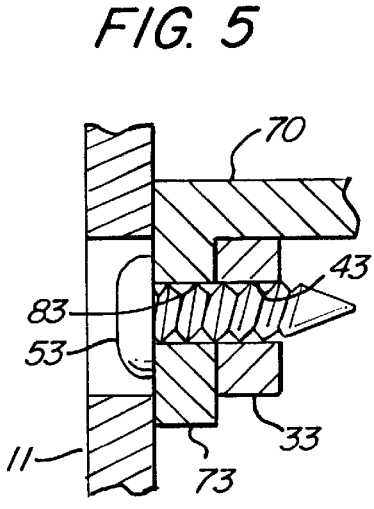

ELECTRICAL JUNCTION BOX AND SUPPORT BRACKET HAVING SLIDING ATTACHMENT

CROSS-REFERENCE TO RELATED PATENT APPLICATIONS

This application discloses apparatus described and claimed in a related copending application Ser. No, 09/103, 251 filed Jun. 23, 1998 on behalf of the Applicant of the present application, Ronald Webb, which is entitled ELECTRICAL JUNCTION BOX MOUNTING BRACKET DEVICE AND METHOD.

FIELD OF THE INVENTION

This invention relates generally to electrical power distribution apparatus and particularly to electrical junction boxes and apparatus for supporting electrical junction boxes within site walls.

BACKGROUND OF THE INVENTION

One of the most important devices utilized within electrical distribution systems is found in the junction box and its supporting apparatus. In a typical electrical wiring system of the type utilized in residential, commercial or industrial facilities, electrical power is provided to the facility at a main distribution box. The distribution box in turn supports a plurality of circuit breakers and/or fuses which provide a plurality of distribution circuits for distributing electrical power to various areas of the facility. In essence, this distribution involves providing an electrical feed line into a general area such as a room or combination of rooms. The electrical power is then distributed to a plurality of junction boxes within the room or rooms. In a typical installation, a substantial number of junction boxes are situated within room walls relatively close to the floor. These junction boxes typically support one or more socket assemblies. These socket assemblies are configured to provide plug-in receptacles which are utilized to receive electrical plugs of various power using devices.

While a substantial number of methods and apparatus have been provided for supporting junction boxes in this application, one the more novel structures and methods developed in recent years is shown in U.S. Pat. No. 5,098, 046 as well as U.S. Pat. Nos. 5,224,673 and 5,288,041, all of which are issued to Ronald Webb. In particular, U.S. Pat. No. 5,098,046 sets forth an ELECTRICAL JUNCTION BOX MOUNTING BRACKET DEVICE AND METHOD for use within the interior hollow of partitions having a front wall and a back wall and a hollow space therebetween. A base capable of being fixedly secured to the floor supports a vertically extending riser which in turn defines an annular plate having front and rear faces at the upper portion thereof. An opening formed in the annular plate is sufficiently large to receive an electrical device accessible from the exterior side of the front wall. The annular plate also includes mounting holes for attaching a cover ring to its front face and a junction box to its rear face. In the preferred embodiment, a stabilizing arm extends rearwardly from the annular plate and is sufficient in length to span the hollow portion of the wall. A plurality of apertures are formed in the annular plate which receive fasteners extending therethrough, The junction box includes inwardly extending tabs having apertures formed therein which also receive the threaded fasteners. The cooperation of the threaded fasteners and the tabs of the junction box cooperate to secure the junction box to the rear face of the riser.

While these prior art structures have provided improvement in the art and have in some instances enjoyed commercial success, there remains nonetheless a continuing need for evermore efficient, low cost and effective apparatus for securing and supporting junction boxes within residential, commercial or industrial facility walls.

SUMMARY OF THE INVENTION

Accordingly, it is a general object of the present invention to provide an improved electrical junction box and support bracket. It is a more particular object of the present invention to provide an improved electrical junction box and support bracket suitable for use within the hollow space of a typical partition or wall. It is a still more particular object of the present invention to provide an improved electrical junction box and support bracket which is more conveniently and easily assembled within a partition or wall.

In accordance with the present invention, there is provided an electrical junction box and support assembly comprising: a riser having a box mounting portion and means for supporting the riser within a wall space; a pair of upper tab-receiving slots and a lower pair of tab-receiving slots formed in the box mounting portion; a junction box having an open face including an upper edge and a lower edge; a pair of upper tabs extending downwardly from the upper edge; and a pair of lower tabs extending upwardly from the lower edge, the lower tabs being longer than the upper tabs and having sufficient length to allow the junction box to be attached to the box mounting portion by sliding the lower tabs upwardly through the lower pair of tab-receiving slots and thereafter sliding the upper tabs downwardly through the upper tab-receiving slots while the lower tabs remain engaged within the lower tab-receiving slots.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 2 sets forth a partially sectioned side view of the electrical junction box and support bracket of the present invention at the initial step of assembly;

FIG. 3 sets forth the partial section view of FIG. 2 showing an intermediate step in the assembly of the junction box to the support bracket;

FIG. 4 sets forth a partial section view of the present invention electrical junction box and support bracket at a further step of assembly;

FIG. 5 sets forth a partial section view of the present invention electrical junction box and support bracket showing the fastener attachment to the upper tabs of the junction box;

DESCRIPTION OF THE PREFERRED EMBODIMENT

Figure 1:
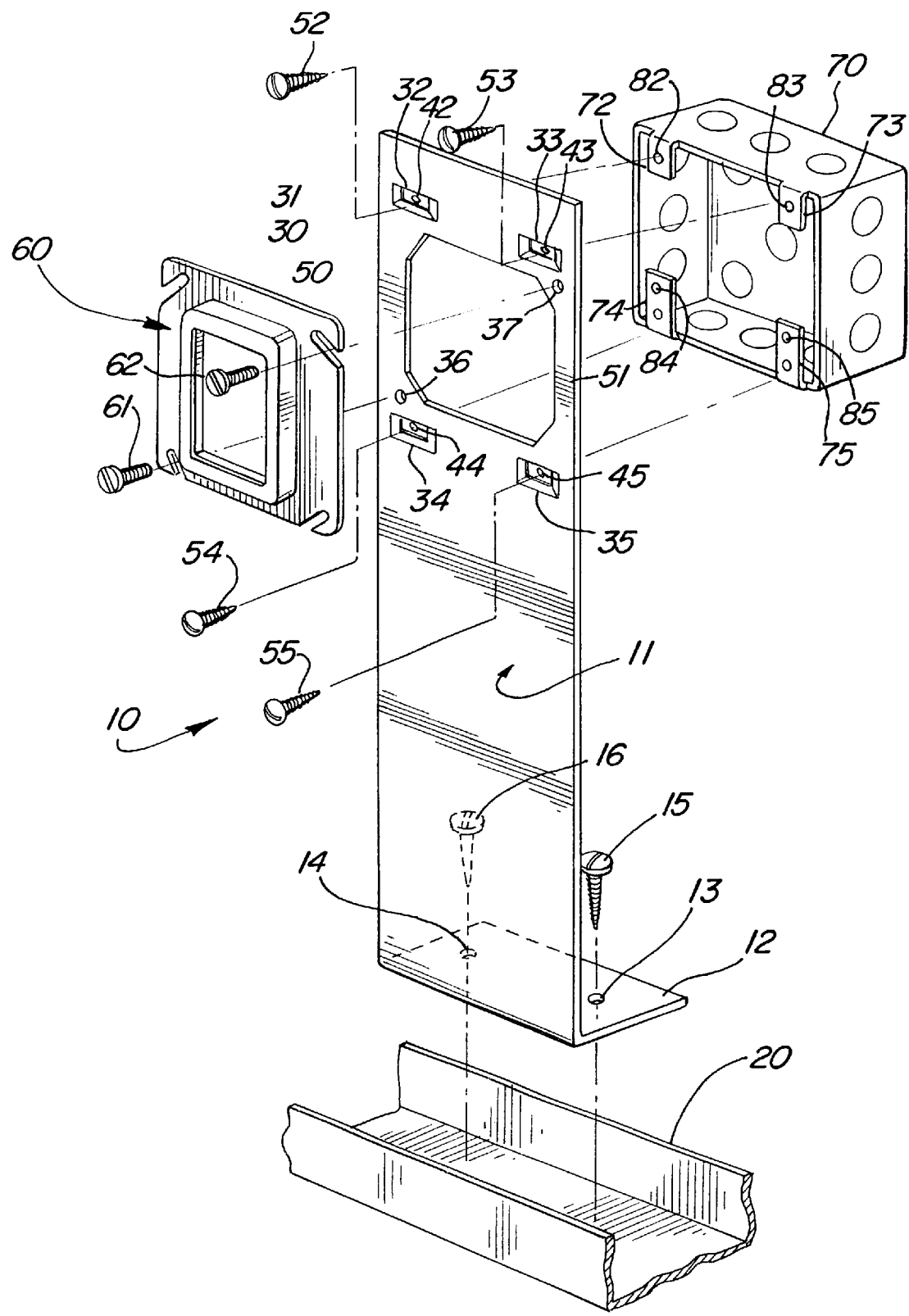
FIG. 1 sets forth a perspective assembly view of an electrical junction box and support bracket constructed in accordance with the present invention.
Figure 6:
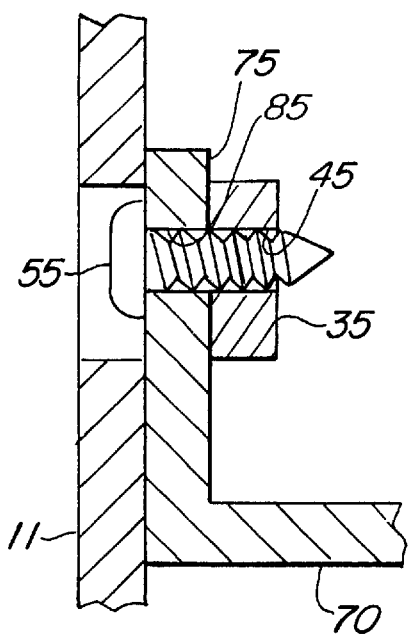
FIG. 6 sets forth a partial section view of the present invention electrical junction box and support bracket showing the attachment of the fastener to the lower tabs of the junction box.
Figure 7:
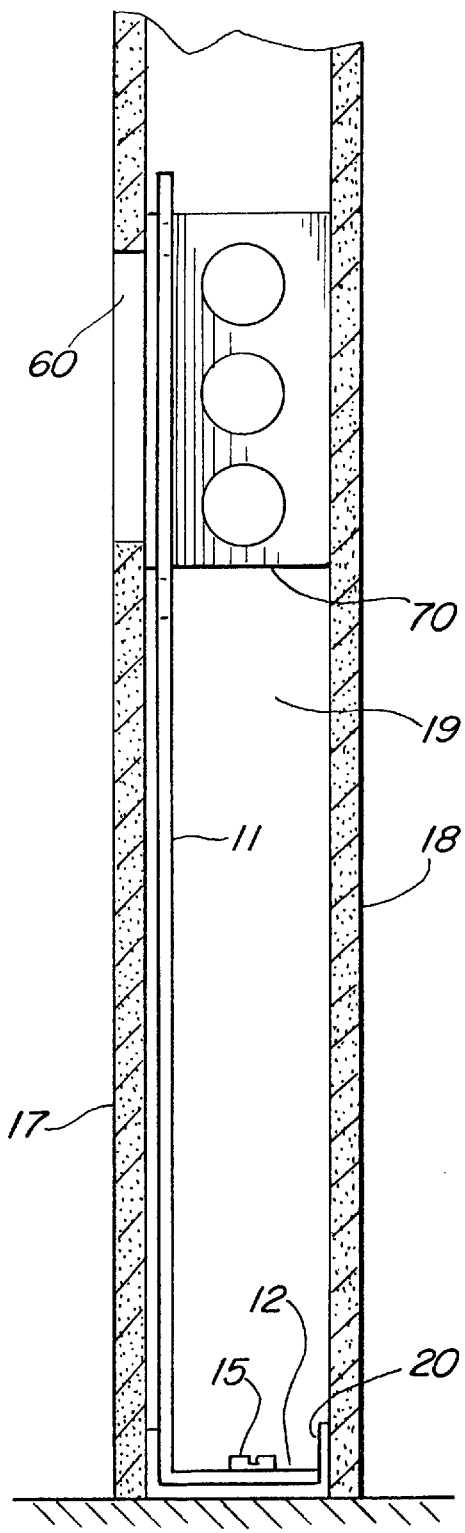
FIG. 7 sets forth a section view of the present invention electrical junction box and support bracket within a typical wall or partition.

FIG. 1 sets forth a perspective assembly view of an electrical junction box and support bracket constructed in accordance with the present invention and generally referenced by numeral 10. A floor track 20 defines a generally U-shaped cross section and, as is better seen in FIG. 7, is supported within a typical wall or partition fabrication. A riser 11 includes a base 12 receivable within floor track 20 and defining a pair of apertures 13 and 14. Base 12 is secured within floor track 20 by 20 fasteners 15 and 16. Riser 11 further defines a box mounting portion 30 having an opening 31 formed therein. A pair of apertures 36 and 37 are positioned diagonally with respect to opening 31. In further accordance with the present invention, box mounting portion 30 includes a plurality of tab-receiving slots 32, 33, 34 and 35. Slots 32 through 35 are formed in the manner seen in FIGS. 5 and 6 to receive mounting tabs of box 70 in the manner set forth below. Slots 32 through 35 define respective rear surfaces having apertures 42 through 45 formed therein. In the preferred fabrication of the present invention, tab-receiving slots 32 through 35 are formed by punching rectangular apertures in riser 11 to form generally U-shaped tab-receiving slot mechanisms.

A cover ring 60 is fabricated in accordance with conventional fabrication techniques and is secured to front surface 50 of box mounting portion 30 by a pair of fasteners 61 and 62.

In accordance with the present invention, a junction box 70 includes a pair of downwardly extending tabs 72 and 73 on the upper front edge thereof and a pair of upwardly-extending tabs 74 and 75 extending upwardly from the lower frontal edge thereof. In further accordance with the present invention, lower tabs 74 and 75 are substantially longer than upper tabs 72 and 73. Tabs 72 and 73 define respective apertures 82 and 83 while tabs 74 and 75 define respective apertures 84 and 85. In accordance with the assembly set forth below in FIGS. 2 through 4 in greater detail, box 70 is initially secured to box mounting portion 30 of riser 11 by positioning tabs 74 and 75 beneath slots 44 and 45 respectively. Thereafter, box 70 is moved upwardly to slide tabs 74 and 75 upwardly through slots 44 and 45. Finally, box 70 is then positioned to align tabs 72 and 73 above slots 32 and 33 respectively. Once tabs 72 and 73 are aligned with slots 32 and 33, box 70 is moved downwardly sliding tabs 72 and 73 into slots 32 and 33. In accordance with the present invention and as is described below in greater detail, the additional length of lower tabs 74 and 75 causes tabs 74 and 75 to remain within slots 34 and 35 respectively as box 70 is moved downwardly to insert tabs 72 and 73. As a final assembly step, one or more fasteners may be secured within slots 32 through 35 to further secure tabs 72 through 75 within slots 32 through 35. For purposes of illustration, FIG. 1 shows a plurality of fasteners 52 through 55 aligned with slots 32 through 35. The attachment of fasteners within slots 32 through 35 is shown for upper tab 73 and slot 33 in FIG. 5 while the attachment for fastener 55 within lower slot 35 and lower tab 75 is shown in FIG. 6. It will be understood that, in most installations, a single fastener or pair of fasteners diagonally placed will be sufficient to secure box 70. However, it will be apparent that in other installations, additional attachment security may be provided by using all four of fasteners 52 through 55.

FIGS. 2, 3 and 4 set forth sequential partial section views showing the sliding attachment of the present invention which secures electrical junction box 70 to box mounting portion 30 of riser 11. It will be noted that FIG. 2 shows the initial alignment of box 70 in preparation for sliding attachment while FIG. 3 shows the final alignment of box 70 and FIG. 4 shows the completed sliding attachment of box 70 to box mounting portion 30.

More specifically, riser 11 includes a box mounting portion 30 supporting a pair of slots 33 and 35. A junction box 70 includes a downwardly extending tab 73 having an aperture 83 formed therein together with an upwardly extending tab 75 having an aperture 85 formed therein. It will be noted that box 70 further supports a downwardly extending tab 72 and an upwardly extending tab 74 in the manner seen in FIG. 1. It will be understood that the attachment of tab 73 within slot 33 and tab 75 within slot 35 is also occurring between tab 72 and slot 32 as well as tab 74 and slot 34 (seen in FIG. 1).

In the initial alignment position shown in FIG. 2, box 70 is positioned such that tab 75 is aligned beneath slot 35. To accommodate this position, box 70 is angled rearwardly slightly as shown.

FIG. 3 sets forth an intermediate position of the present invention sliding attachment between box 70 and riser 11. In the position shown in FIG. 3, box 70 has been moved upwardly from the position shown in FIG. 2 such that tab 75 is moved upwardly through slot 35.

More specifically, riser 11 includes a box mounting portion 30 supporting a pair of slots 33 and 35. A junction box 70 includes a downwardly extending tab 73 having an aperture 83 formed therein together with an upwardly extending tab 75 having an aperture 85 formed therein. It will be noted that box 70 further supports a downwardly extending tab 72 and an upwardly extending tab 74 in the manner seen in FIG. 1. It will be understood that the attachment of tab 73 within slot 33 and tab 75 within slot 35 is also occurring between tab 72 and slot 32 as well as tab 74 and slot 34 (seen in FIG. 1).

As is seen in FIG. 3, the upward movement of box 70 moves tab 75 through slot 35 and positions tab 73 above slot 33. It will be noted that a corresponding position of tab 74 within slot 34 and tab 72 above slot 32 (seen in FIG. 1) results from the intermediate position of FIG. 3. Once tab 73 (and tab 72 seen in FIG. 1) have been aligned above slots 32 (seen in FIG. 1) and slot 33, box 70 is moved downwardly from the position shown in FIG. 3 to the assembled position shown in FIG. 4. In accordance with an important aspect of the present invention, the additional lengths of tabs 74 and 75 (tab 74 seen in FIG. 1) ensures that tabs 74 and 75 remain engaged within slots 34 and 35 (slot 34 seen in FIG. 1) during the downward movement of box 70.

FIG. 4 sets forth a partial section view of box 70 in its final position upon riser 11 following the present invention sliding attachment.

More specifically, riser 11 includes a box mounting portion 30 supporting a pair of slots 33 and 35. A junction box 70 includes a downwardly extending tab 73 having an aperture 83 formed therein together with an upwardly extending tab 75 having an aperture 85 formed therein. It will be noted that box 70 further supports a downwardly extending tab 72 and an upwardly extending tab 74 in the manner seen in FIG. 1. It will be understood that the attachment of tab 73 within slot 33 and tab 75 within slot 35 is also occurring between tab 72 and slot 32 as well as tab 74 and slot 34 (seen in FIG. 1).

With box 70 moved downwardly to the position shown in FIG. 4, tab 73 engages slot 33 while tab 75 extends upwardly through slot 35. With temporary return to FIG. 1, it will be understood that tab 72 engages slot 32 in the same manner as tab 73 engages slot 33. It will be further noted that tab 74 extends upwardly through slot 34 in the same manner as tab 75 extends upwardly through slot 35.

Returning to FIG. 4, one or more of a plurality of fasteners 53 and 55 may then be threadably inserted into tabs 73 and 75 as well as the rear portions of slots 33 and 35 as desired to further secure box 70.

FIG. 5 sets forth a partial section view of the completed attachment of tab 73 within slot 33 using fastener 53. As described above, riser 11 supports slot 33 which receives tab 73 following the above-described sliding attachment. Tab 73 defines an aperture 83 while slot 33 defines an aperture 43. Apertures 83 and 43 are aligned and receive fastener 53 in a self-tapping threaded engagement. While not seen in FIG. 5, it will be understood that the attachment shown therein applies equally well to the attachment of tab 72 within slot 32 using fastener 52 (all seen in FIG. 1).

FIG. 6 sets forth a partial section view showing the attachment of tab 75 of box 70 within slot 35 of riser 11. As described above, tab 75 extends upwardly through slot 35 in the position shown in FIG. 4. As is also described above, tab 75 defines an aperture 85 while the rear portion of slot 35 defines an aperture 45. Apertures 45 and 85 are in general alignment allowing a self-tapping fastener 55 to be threaded thereto. It will be recalled that the attachment of tab 74 within slot 34 using fastener 54 (all seen in FIG. 1) is carried forward in the same manner as shown in FIG. 6.

FIG. 7 sets forth a partial section side elevation view showing a typical partition or wall having a front wall board 17, a rear wall board 18 and a space 19 formed therebetween. A conventional floor track 20 is positioned between wall boards 17 and 18. A riser 11 includes a base 12 secured to track 20 and extending upwardly through space 19. Riser 11 supports a cover ring 60 and a junction box 70 in the fabrication described above.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An electrical junction box and support assembly comprising:
    a riser having a box mounting portion and means for supporting said riser within a wall space;
    a pair of upper tab-receiving slots and a lower pair of tab-receiving slots formed in said box mounting portion;
    a junction box having an open face including an upper edge and a lower edge;
    a pair of upper tabs extending downwardly from said upper edge; and
    a pair of lower tabs extending upwardly from said lower edge,
    said lower tabs being longer than said upper tabs and having sufficient length to allow said junction box to be attached to said box mounting portion by sliding said lower tabs upwardly through said lower pair of tab-receiving slots and thereafter sliding said upper tabs downwardly through said upper tab-receiving slots while said lower tabs remain engaged within said lower tab-receiving slots.

2. The electrical junction box and support assembly set forth in claim 1 wherein said upper and lower slots each define forwardly open generally U-shaped members each defining a rear face.

3. The electrical junction box and support assembly set forth in claim 2 wherein said upper and lower tabs each define a tab aperture and wherein each of said rear faces define a face aperture, said tab apertures and said face apertures aligning when said upper tabs are inserted into said upper tab-receiving slots.

4. The electrical junction box and support assembly set forth in claim 3 further including at least one fastener threadably engaging at least one of said upper tabs and upper tab-receiving slots within said tab aperture and face aperture thereof.

5. The electrical junction box and support assembly set forth in claim 4 further including at least one fastener threadably engaging at least one of said lower tabs and lower tab-receiving slots within said tab aperture and face aperture thereof.

6. The electrical junction box and support assembly set forth in claim 3 further including at least one fastener threadably engaging at least one of said lower tabs and lower tab-receiving slots within said tab aperture and face aperture thereof.

7. An electrical junction box and support assembly comprising:
    a riser having a box mounting portion defining an opening, a pair of forwardly open generally U-shaped tab-receiving upper slots positioned above said opening and a pair of forwardly open generally U-shaped tab-receiving lower slots positioned beneath said opening and means for supporting said riser within a wall space;
    a junction box defining an open front defining an upper edge and a lower edge;
    first and second tabs extending downwardly from said upper edge each defining a first length; and
    third and fourth tabs extending upwardly from said lower edge each defining a second length substantially greater than said first length,
    said first and second lengths being selected to facilitate sliding attachment of said junction box to said box mounting portion by initially sliding said third and fourth tabs upwardly through said lower slots and thereafter sliding said junction box downwardly to insert said first and second tabs downwardly into said upper tab-receiving slots while maintaining said third and fourth tabs within said lower tab-receiving slots.

* * * * *